Figure 1:
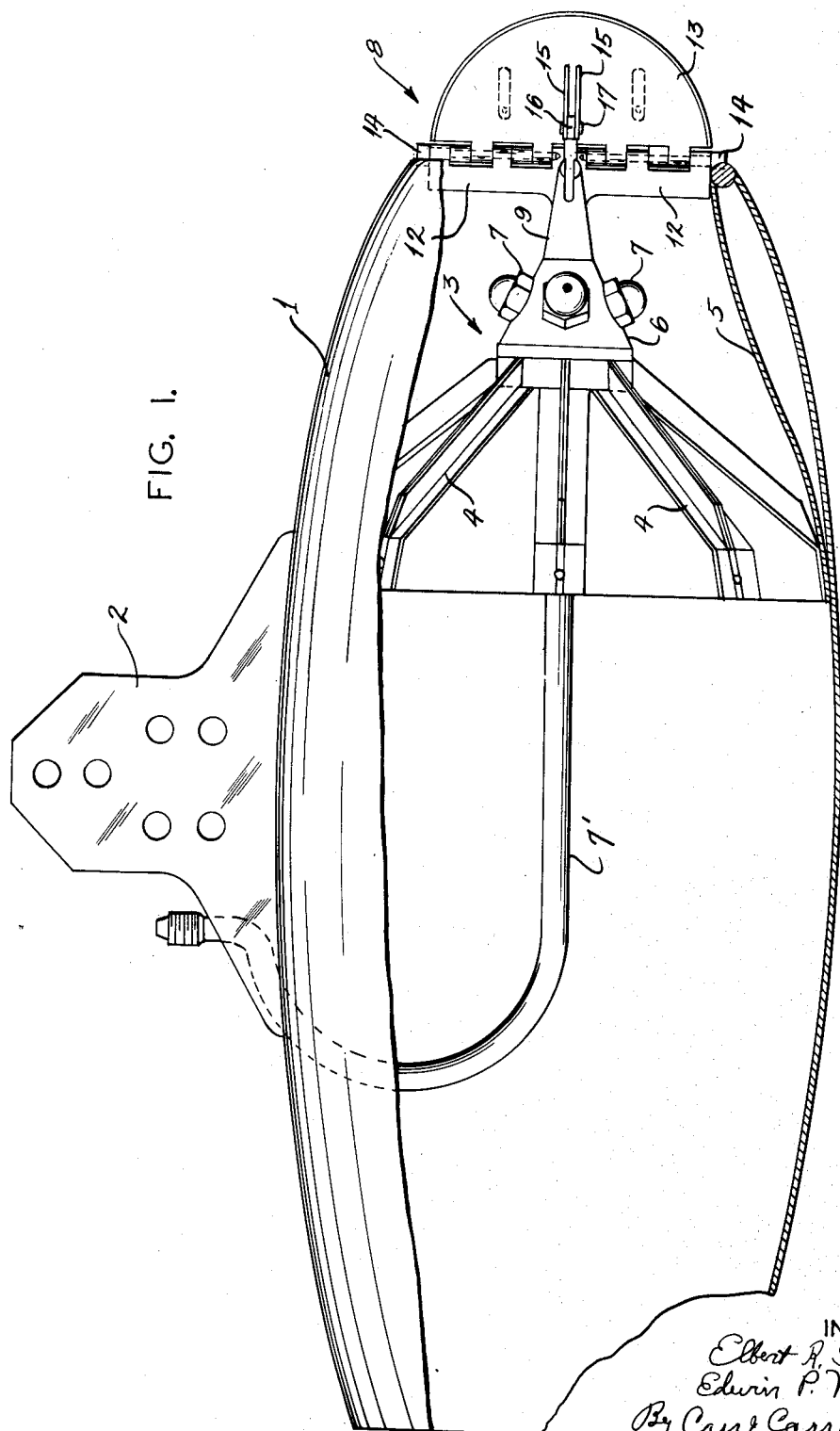

July 5, 1955

E. R. SARGENT ET AL 2,712,217

MECHANISM FOR REDUCING THE DRAG OF RAM JET ENGINES

Filed April 28, 1950

2 Sheets-Sheet 1

FIG. I.

INVENTORS
Elbert R. Sargent,
Edwin P. Neibirk,
By Carr & Carr & Gravely
HIS ATTORNEYS.

July 5, 1955  E. R. SARGENT ET AL  2,712,217
MECHANISM FOR REDUCING THE DRAG OF RAM JET ENGINES
Filed April 28, 1950  2 Sheets-Sheet 2

INVENTORS:
Elbert R. Sargent,
Edwin P. Neikirk,
By Carr, Carr & Gravely,
HIS ATTORNEYS.

United States Patent Office 2,712,217
Patented July 5, 1955

2,712,217

MECHANISM FOR REDUCING THE DRAG OF RAM JET ENGINES

Elbert R. Sargent and Edwin P. Neikirk, Ferguson, Mo., assignor to McDonnell Aircraft Corporation, St. Louis, Mo., a corporation of Maryland Application April 28, 1950, Serial No. 158,746

9 Claims. (Cl. 60—35.6)

This invention relates to ram jet engines for helicopters and is more particularly directed to a device that will reduce the drag caused by an idle engine, thereby improving the autorotation characteristics of the helicopter rotor.

The primary object of the invention is to provide a device for ram jet engines used on helicopters that will reduce the drag of the engine when the engine is not producing a thrust, thus improving the autorotation characteristics of the helicopter rotor.

Another object of the invention is to provide a mechanism for closing the inlet end of a ram jet engine casing securable to helicopter rotors closed by air acting thereon so that in the event of engine failure, the inlet end will be closed, thus improving the autorotation characteristics of the helicopter rotor.

A further object of the invention is to provide a mechanism for the inlet end of a ram jet engine casing suitable for mounting on the outboard end of a helicopter rotor blade, which mechanism is opened in response to pressure applied to the fuel supplied to the engine and closed by air pressure acting on the mechanism so that in the event fuel is not being supplied to the engine, the drag thereof will be reduced, thus obviating the necessity of special auxiliary equipment.

This invention consists in the provision of a closure for the inlet end of a ram jet engine casing to be mounted on the outboard end of the helicopter rotor blades, the closure being actuated to open position by a fluid motor operable by the pressured fuel supplied to the engine and which is actuated to closed position by air pressure acting thereon when fuel is not being supplied to the engine, the closure reducing the drag of the engine, thereby improving the autorotation characteristics of the helicopter rotor.

Figure 2:
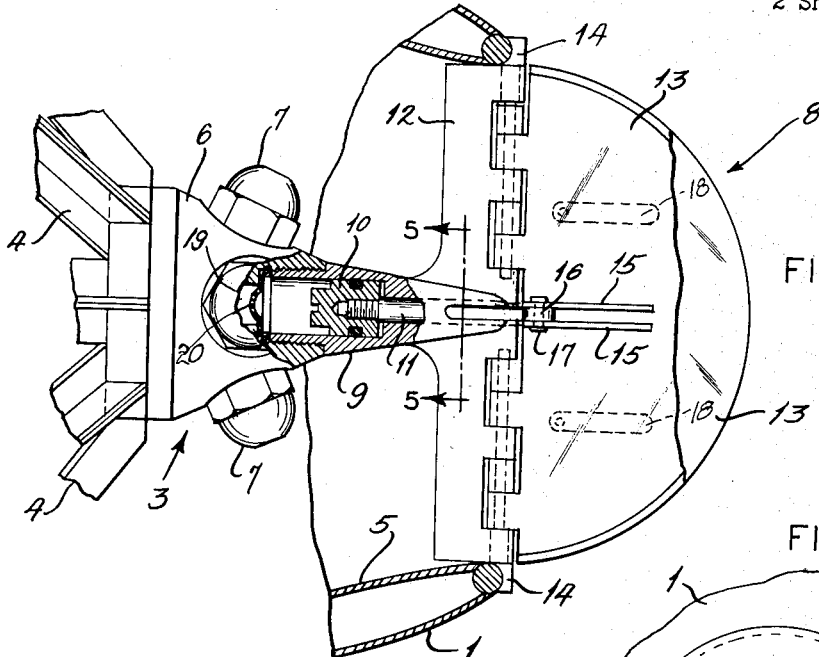
Figure 5:
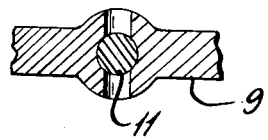
Figure 4:
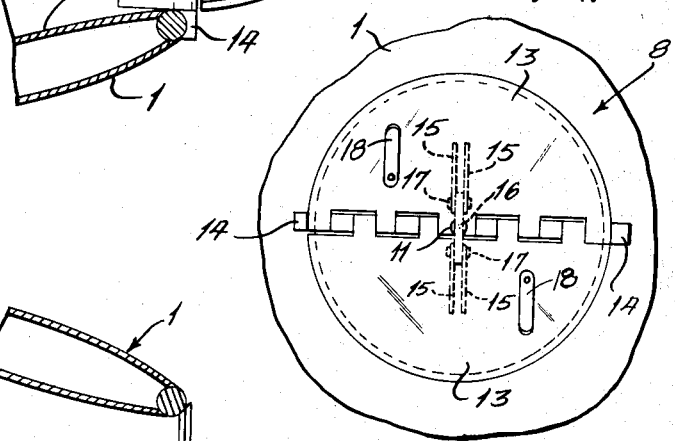
Figure 3:
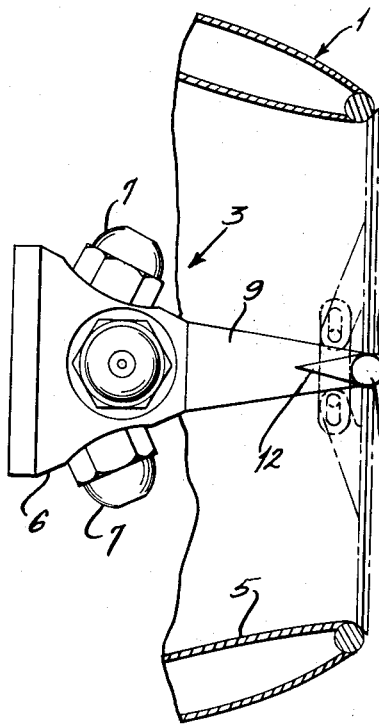

In the drawings:

Fig. 1 is a side elevational view of a ram jet engine, partly in section, incorporating the invention, Fig. 2 is an elevational view of the engine closure in open position showing the actuating mechanism, Fig. 3 is a view similar to Fig. 2 showing the closure rotated 90° in full lines in open position and in dotted lines in closed position, Fig. 4 is a front elevational view thereof; and Fig. 5 is a sectional view taken on the line 5—5 of Fig. 2.

This invention is embodied in the structure set forth in the several figures of the drawings in which the numeral 1 designates the casing of a ram jet engine securable to the outboard end of helicopter rotor wings by means of a bracket 2 forming part of the casing 1. A nozzle assembly 3 is mounted in the casing 1 by means of a plurality of angularly disposed struts 4, acting as flame holders, secured to the interior wall of the casing at the same point that the diffuser 5 is secured thereto, the fastening means for the struts and the diffuser being a common element. The nozzle assembfy 3 consists of a housing 6 to which is secured a plurality of discharge nozzles 7 whose orifices are directed forwardly and upwardly toward the diffuser 5. Fuel is supplied to housing 6 through a conduit 7' connectable to a conduit which is located in the helicopter rotor wings and is then connected to a suitable source of supply. Fuel is admitted to the housing under high pressure so that it is delivered into the casing in very finely divided form.

The autorotation characteristics of helicopter rotors equipped with ram jet engines are very unfavorable because of the drag produced by the ram jet engine when not delivering a thrust. These characteristics are improved by means of a closure 8 fitted over the inlet end of the ram jet engine casing 1. This closure consists of a tubular member 9 threaded into the nozzle housing 6, the tubular member being bored to receive a piston rod 11 connected thereto. The bore of the housing in which piston 10 is slidably disposed is interiorly connected to the bore in nozzle housing 6 so that fuel under pressure may be applied to the end of piston 10. The tubular member 9 is provided with a hinged member 12 radially disposed with respect to the tubular member and to the inlet end of the casing 1. Two semi-circular doors 13 are fastened to the hinged member 12 by means of pintles 14. Each of the doors is provided wtih arms 15 connected to a lever 16 secured to rod 11. The lever 16 is connected to arms 15 by means of a pin and slot connection 17 so that when piston 10 is moved in the bore in the tubular member 9, the doors will swing about pintles 14.

Fuel supplied to the nozzle housing 6 will force the piston 10 toward the right, as viewed in Figs. 2 and 3, thereby holding the doors 13 in open position. When the pressure of the fuel is reduced, or in event of failure of the fuel supply, the air pressure acting on the forward end of casing 1 will also act on doors 13; and since there is no pressure in the bore in the tubular member 9, this air will close the doors. The air pressure is caused by the closed end of casing 1 moving through air by the rotation of the helicopter rotor. For the purpose of assisting in the closing operation, springs 18 may be provided for assisting in initiating movement of the doors toward closed position. When the full force of the air pressure acting thereon has been achieved, the closure of the doors will be completed, thus reducing the drag of the engine on the helicopter rotor and at the same time improving the autorotation characteristics of the rotor. This structure utilizes the pressure of the fuel supplied to the engine, thereby eliminating the need for additional mechanism for accomplishing the desired result.

During the time the doors are closing, the movement of the piston is controlled by a diaphragm 19 having an aperture 20 therein through which fluid may pass from one side of the diaphragm to the other. Fuel under pressure enters the space between the piston and the diaphragm. Upon failure of fuel pressure, the aperture 20 will regulate the speed at which the doors close, thereby preventing damage thereto by reason of closing too rapidly.

What we claim is:

1. A ram jet engine comprising a casing having an air inlet end, a nozzle assembly mounted in said casing for receiving fuel under pressure in passageways provided therefor, a cylinder mounted on said nozzle in communication with said passageways, a piston in said cylinder, a pair of inlet doors hinged to said cylinder and normally subjected to air pressure; and means connected between said piston and doors for permitting the piston to actuate said doors to open position while fuel is being supplied to said nozzle, the closures being actuated to closed position by air pressure in the event fuel is not being supplied to said nozzle.

2. A ram jet engine comprising a casing provided with an inlet opening, a nozzle assembly mounted in said casing and including a housing having a bore therein and a plurality of discharge nozzles thereon to which fuel is supplied under pressure, a tubular member having a bore therein and secured to said housing, a piston in said bore, a piston rod secured to said piston and projecting from said tubular member, a hinged member forming a part of said tubular member and disposed radially across said inlet opening, a pair of doors pivotally secured to said hinged member; and a lever secured to said piston rod for moving said doors and holding same in open position when fuel pressure is supplied to said piston.

3. A ram jet engine comprising a casing having an air inlet end, a fuel discharge nozzle assembly mounted in said casing, a fluid motor device consisting of a cylinder formed in said nozzle, a piston in said cylinder operable by fuel supplied to said nozzle, a closure for said inlet end pivotally mounted on said nozzle, means connecting said piston and closure for permitting said fluid motor to actuate the closure to open position while fuel is being supplied to said nozzle; and a diaphragm fitted over the end of said cylinder and having an aperture therein for regulating the rate at which said closure operates.

4. A ram jet engine comprising a casing having an air inlet end, a nozzle assembly mounted in said casing for receiving fuel under pressure in passageways provided therefor, a cylinder mounted on said nozzle in communication with said passageways, a piston in said cylinder, a pair of inlet doors hinged to said cylinder and normally subjected to air pressure, means connected between said piston and doors for permitting the piston to actuate said doors to open position while fuel is being supplied to said nozzle, the closures being actuated to closed position by air pressure in the event fuel is not being supplied to said nozzle; and a diaphragm fitted over the end of said cylinder and having an opening therein for controlling the rate of closing of said doors.

5. A ram jet engine comprising a casing having an air inlet at its forward end, a closure for said inlet end including members pivotally mounted adjacent said inlet end and movable with respect to said casing, means for discharging fuel under pressure into said casing including a housing and fuel nozzles connected to said housing; closure operating means connected into said housing and located adjacent said inlet end, said last means being responsive to the fuel pressure for actuating said closure to full open position, and means in said closure operating means connected to said housing to regulate the rate of operation of said closure.

6. A ram jet engine comprising a casing having an air inlet at its forward end, a closure for said inlet end including members pivotally mounted adjacent said inlet end and movable with respect to said casing, means to which fuel is supplied under pressure for discharge into said casing and including a housing, fuel nozzle thereon and a fluid motor device connected into said housing; means connected between said device and said closure for permitting said device to actuate said closure to full open position when fuel is supplied to said means, and means in said fluid motor to regulate the rate of operation of said closure.

7. A ram jet engine comprising a casing having a ram air inlet at its forward end, a closure for said inlet end normally subjected to pressure effect of the ram air, nozzle means inwardly of said ram air inlet end for receiving fuel under pressure and for discharging it into said casing; displacement means in fuel flow connection with said nozzle means, said displacement means being operable by the pressure of the fuel for actuating said closure to open position, the closure being actuated to closed position by air under pressure being applied thereto, and fuel flow restricting means in said displacement means to regulate the rate of operation of said closure.

8. A ram jet engine comprising a casing having an air inlet end, a fuel discharge nozzle assembly mounted in said casing at the inlet end, a fluid motor device consisting of a cylinder and a piston connected in fuel flow relation with said nozzle, the piston being operable by the pressure of the fuel supplied to said nozzle, a closure for said inlet end pivotally mounted on said cylinder for closing said air inlet end; and means connecting said piston and closure for permitting said fluid motor to actuate the closure to open position in response to the pressure of fuel being supplied to said nozzle.

9. A ram jet engine comprising a casing having an air inlet end, a member mounted at the air inlet end of said casing and movable between a first position admitting full flow of air into said inlet end and a second position restricting the air flow into said inlet, fuel discharging means in said casing inwardly of the inlet end, a conduit connected to said discharging means to conduct fuel under pressure thereto, and displacement means connected between said movable member and said fuel discharging means to receive fuel under pressure and transmit the force of the fuel pressure to said movable member to move the latter toward its said first position to admit ram air for mixing with the fuel discharged by said discharging means.

References Cited in the file of this patent

UNITED STATES PATENTS

| | | |
|---|---|---|
| 2,446,129 | Dalton | July 27, 1948 |
| 2,446,266 | Cummings | Aug. 3, 1948 |
| 2,540,594 | Price | Feb. 6, 1951 |
| 2,565,854 | Johnstone et al. | Aug. 28, 1951 |
| 2,577,919 | Roy | Dec. 11, 1951 |
| 2,610,464 | Knoll | Sept. 16, 1952 |
| 2,610,465 | Imbert et al. | Sept. 16, 1952 |

FOREIGN PATENTS

| | | |
|---|---|---|
| 544,834 | Germany | Feb. 29, 1932 |
| 919,004 | France | Nov. 18, 1946 |
| | (corresponds to U. S. 2,565,845) | |